United States Patent
Lee et al.

(10) Patent No.: US 10,472,007 B2
(45) Date of Patent: Nov. 12, 2019

(54) CATERPILLAR DEVICE

(71) Applicant: TAS GLOBAL CO., LTD., Busan (KR)

(72) Inventors: Dong Wook Lee, Seoul (KR); Yu Sik Kim, Seoul (KR)

(73) Assignee: TAS GLOBAL CO., LTD., Seoul (KR)

( * ) Notice: Subject to any disclaimer, the term of this patent is extended or adjusted under 35 U.S.C. 154(b) by 171 days.

(21) Appl. No.: 15/529,019

(22) PCT Filed: Nov. 17, 2015

(86) PCT No.: PCT/KR2015/012358
§ 371 (c)(1),
(2) Date: May 23, 2017

(87) PCT Pub. No.: WO2016/085184
PCT Pub. Date: Jun. 2, 2016

(65) Prior Publication Data
US 2017/0253285 A1    Sep. 7, 2017

(30) Foreign Application Priority Data
Nov. 28, 2014    (KR) .................. 10-2014-0168188

(51) Int. Cl.
B62D 55/265    (2006.01)
B63B 59/06    (2006.01)
(Continued)

(52) U.S. Cl.
CPC ............ B62D 55/265 (2013.01); B08B 13/00 (2013.01); B62D 55/02 (2013.01); B62D 55/075 (2013.01);
(Continued)

(58) Field of Classification Search
CPC .... B62D 55/265; B62D 55/075; B62D 55/02; B62D 55/30; B62D 55/20; H01F 7/06;
(Continued)

(56) References Cited

U.S. PATENT DOCUMENTS

| 1,966,450 | A | * | 7/1934 | Knox | .................. | B62D 55/211 |
| | | | | | | 305/160 |
| 4,789,037 | A | | 12/1988 | Kneebone | | |
| 8,567,536 | B1 | * | 10/2013 | Canfield | .............. | B62D 55/075 |
| | | | | | | 180/9.21 |
| 2009/0078484 | A1 | * | 3/2009 | Kocijan | .................. | B60L 13/04 |
| | | | | | | 180/167 |
| 2014/0077587 | A1 | * | 3/2014 | Smith | .................... | B63B 59/10 |
| | | | | | | 305/15 |

(Continued)

FOREIGN PATENT DOCUMENTS

| JP | 1976-35760 | 4/1976 |
| JP | 1988-53185 A | 7/1988 |

(Continued)

*Primary Examiner* — S. Joseph Morano
*Assistant Examiner* — Jean W Charleston
(74) *Attorney, Agent, or Firm* — Heedong Chae; Lucem, PC (57) ABSTRACT

A caterpillar device includes: a water film removing part which is provided in a power transmission member including chains, presses and removes a water film between an attachment object as a magnetic material, and the power transmission member with a magnetic force, and attaches the power transmission member to the attachment object to secure a frictional force; and an apparatus body magnet attachment part which is connected to the power transmission member and attaches the body of the apparatus to the attachment object.

13 Claims, 10 Drawing Sheets

(51) Int. Cl.
  *B62D 55/20* (2006.01)
  *B62D 55/30* (2006.01)
  *B08B 13/00* (2006.01)
  *B63G 8/00* (2006.01)
  *H01F 7/02* (2006.01)
  *H01F 7/06* (2006.01)
  *B62D 55/02* (2006.01)
  *B62D 55/075* (2006.01)
  *B63B 59/10* (2006.01)

(52) U.S. Cl.
  CPC ............. *B62D 55/20* (2013.01); *B62D 55/30* (2013.01); *B63B 59/06* (2013.01); *B63G 8/001* (2013.01); *H01F 7/02* (2013.01); *H01F 7/06* (2013.01); *B63B 59/10* (2013.01)

(58) Field of Classification Search
  CPC ........... H01F 7/02; B63G 8/001; B08B 13/00; B63B 59/06; B63B 59/10
  USPC ............................ 305/15, 124, 125, 129, 130
  See application file for complete search history.

(56) References Cited

U.S. PATENT DOCUMENTS

| 2016/0121945 A1* | 5/2016 | Rust ..................... B62D 55/14 |
| | | 701/34.4 |
| 2016/0144937 A1* | 5/2016 | Van Rompay .......... B63B 59/08 |
| | | 134/6 |

FOREIGN PATENT DOCUMENTS

| JP | 07-052841 A | 2/1995 |
| JP | 08-142860 A | 6/1996 |
| JP | 10-024875 A | 1/1998 |
| JP | 2004-148893 A | 5/2004 |
| KR | 10-0580921 B1 | 5/2006 |
| KR | 10-2007-0059679 A | 6/2007 |
| KR | 10-0770655 B1 | 10/2007 |
| KR | 10-0811540 B1 | 3/2008 |
| KR | 10-2009-0075311 A | 7/2009 |
| KR | 10-2012-0041922 A | 5/2012 |
| WO | WO2011/056656 A1 | 5/2011 |

* cited by examiner

CATERPILLAR DEVICE

CROSS-REFERENCE TO RELATED APPLICATION

This application claims the benefit of Korean Application No. 10-2014-0168188 filed on Nov. 28, 2014 with the Korean Intellectual Property Office, the disclosure of which is incorporated herein by reference.

TECHNICAL FIELD

The present invention relates to a caterpillar device and more particularly, to a caterpillar device which is capable of securing s frictional force by pressing and removing a water film, which is formed between the apparatus and an attachment object as a ferromagnetic material, using a magnetic force, and capable of attaching the body of the apparatus to the attachment object as a ferromagnetic material using an additional magnetic force.

BACKGROUND ART

When a caterpillar device moves over a surface, such as a surface of the bottom of a ship, formed of a ferromagnetic material coated with materials such paints, there occurs a problem of decrease in a coefficient of friction due to the viscous hydroplaning effect.

The viscous hydroplaning effect differs from the dynamic hydroplaning effect occurring in a vehicle running at a high speed and refers to a water film having thickness of $1/1000$ inch or more, which may be formed at a lower speed.

When the viscous hydroplaning occurs, the coefficient of friction can be allowed up to a level of wet ice (0.05 to 0.1).

On the other hand, the viscous hydroplaning may be removed when a high pressure is applied in a short time or time for which a pressure is applied is long. Since applying a high pressure in a short time is likely to do damage to paints applied on the surface of the bottom of a ship, it is preferable to lengthen time for which a pressure is applied.

Under water, when a pressure between the paints on the surface of the bottom of a ship and a wheel is higher than an ambient water pressure, a water film can be discharged.

Examples of a method of attaching a ship cleaning apparatus to the surface of the bottom of a ship and moving the apparatus under water in consideration of the above-described viscous hydroplaning effect may include i) using a form of wheel, (ii) using a form of caterpillar installed with magnets, and (iii) using a form of caterpillar and separate magnets.

In the method of using a form of wheel, since time for which a pressure is applied has to be lengthened to prevent a wheel from being slid on the surface of the bottom of a ship, a ship cleaning apparatus has to be moved very slowly.

In the method of using a form of caterpillar installed with magnets, if a force to push or vertically pull a ship cleaning apparatus occurs, the viscous hydroplaning is not removed since a magnetic force from magnets of the caterpillar is not sufficient to press the viscous hydroplaning.

In the method of using a form of caterpillar and separate magnets, a force to press individual tracks with a roller is irregular and a water film may be again formed in the bottom of a caterpillar due to an external water pressure if the roller does not press the tracks.

A flow velocity in a harbour is 1 knot or less, while a flow velocity in an anchorage out of the harbor is very high, for example, 2.5 knots or so. Most of ship cleaning and inspecting apparatuses using persons or robots are being used at a flow velocity of 1 knot or less.

Since anchorages out of harbor have demands for ship cleaning and inspection, there is a need of a moving apparatus which can be attached to the surface of the bottom of a ship even at a high flow velocity and should satisfy conditions of vertical attachment force and friction simultaneously.

The above description is only provided as a background to assist in understandings of the present invention but is not intended to elucidate the technique known in the art to which the present invention belongs.

RELATED TECHNICAL DOCUMENT

Patent Document (Patent Document 1) KR Patent Registration No. 10-0811540 (owned by Daewoo Shipbuilding Marine Engineering Co. Ltd., and issued at Jul. 3, 2008)

DISCLOSURE

Technical Problem

Accordingly, it is an object of the present invention to provide a caterpillar device which is capable of securing s frictional force by pressing and removing a water film, which is generated between the apparatus and an attachment object as a ferromagnetic material, using a magnetic force, and capable of attaching the body of the apparatus to the attachment object as a ferromagnetic material using an additional magnetic force.

Technical Solution

According to an aspect of the present invention, there is provided a caterpillar device comprising: a water film removing part which is provided in a power transmission member including chains, presses and removes a water film between an attachment object as a magnetic material and the power transmission member with a magnetic force, and attaches the power transmission member to the attachment object to secure a frictional force; and an apparatus body magnet attachment part which is connected to the power transmission member and attaches the body of the apparatus to the attachment object.

Preferably, the water film removing part includes a ferromagnetic body removably coupled to the power transmission member; a water film removing magnet coupled to the ferromagnetic body; and a friction member coupled to the water film removing magnet.

Preferably, the chains are provided to interconnect a plurality of unit chains each having an attachment member, and the ferromagnetic body is removably coupled to the attachment member.

Preferably, the water film removing magnet includes one of a permanent magnet and an electromagnet.

Preferably, a water drainage groove is provided in the friction member.

Preferably, the friction member is made of one selected from a group consisting of silicone, rubber and urethane.

Preferably, at least one of the ferromagnetic body and the water film removing magnet is treated with molding or coating.

Preferably, the apparatus body magnet attachment part includes a plurality of balance blocks each having a supporting shaft; and a block sprocket which is coupled to the supporting shaft and is connected to the power transmission member in a chain-driving manner.

Preferably, the apparatus body magnet attachment part further includes a block magnet provided in each of the plurality of balance blocks.

Preferably, the apparatus body magnet attachment part further includes a magnetic shielding block which is provided in each of the plurality of balance blocks and shields a magnetic field generated in the block magnet.

Preferably, the block magnet includes one of a permanent magnet and an electromagnet.

Preferably, the caterpillar device further comprises a tension adjusting part which supports the power transmission member of the water film removing part to adjust the tension of the power transmission member.

Preferably, the tension adjusting part includes a tension sprocket which is connected to the power transmission member in a chain-driving manner and supports the power transmission member; and a tension support shaft which is coupled to the tension sprocket and supports the tension sprocket.

Preferably, the water film removing part is provided in two rows, and the apparatus body magnet attachment part is interposed between the water film removing parts arranged in two rows and has both ends corrected to the power transmission member.

Preferably, the caterpillar device is used for at least one of cleaning and inspection of the bottom of a ship.

Advantageous Effects

According to the embodiments of the present inventions, since the water film removing part provided in the power transmission member consistently applies a pressure between the apparatus of this embodiment and the attachment object, thereby securing time for which the viscous hydroplaning effect is removed, a fractional force of the apparatus of this embodiment against the attachment object can be secured.

In addition, the apparatus body can be attached to the ferromagnetic attachment object by the apparatus body magnet attachment part which is connected to the water film removing part and presses the water film removing part toward the attachment object.

MODE FOR INVENTION

In order to fully understand the present invention, advantages of operation of the present invention, and purposes achieved by embodiments of the present invention, the accompanying drawings illustrating preferred embodiments of the present invention and contents described in the accompanying drawings should be referenced.

Hereinafter, preferred embodiments of the present invention will be described with reference to the accompanying drawings. Throughout the drawings, the same elements are denoted by the same reference numerals.

Figure 1:
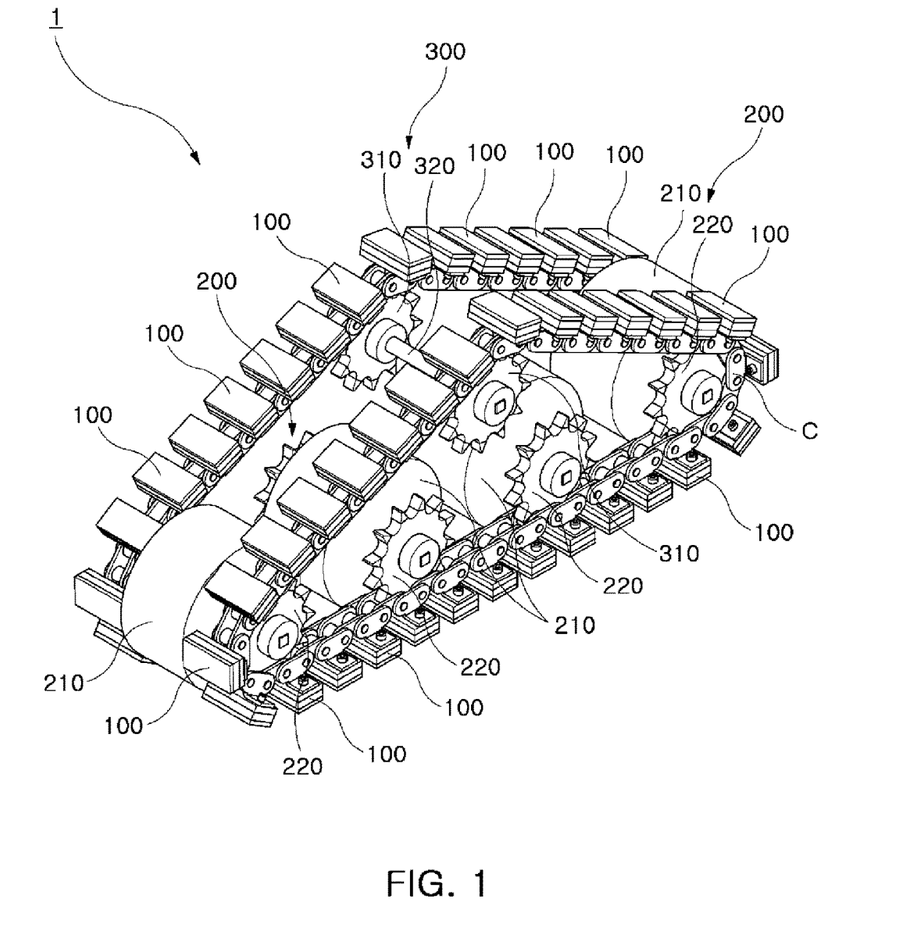
FIG. 1 is a perspective view showing a caterpillar device according to one embodiment of the present invention.
Figure 2:
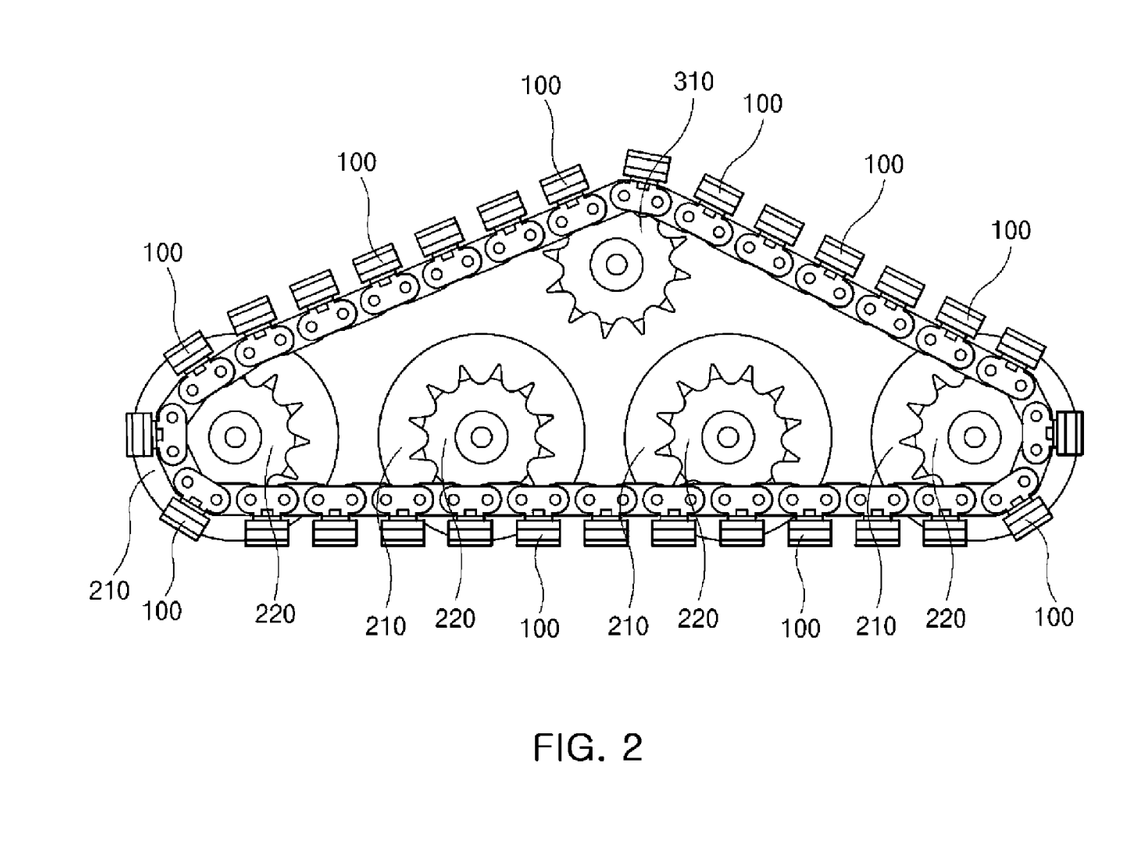
FIG. 2 is a front view of FIG. 1.
Figure 3:
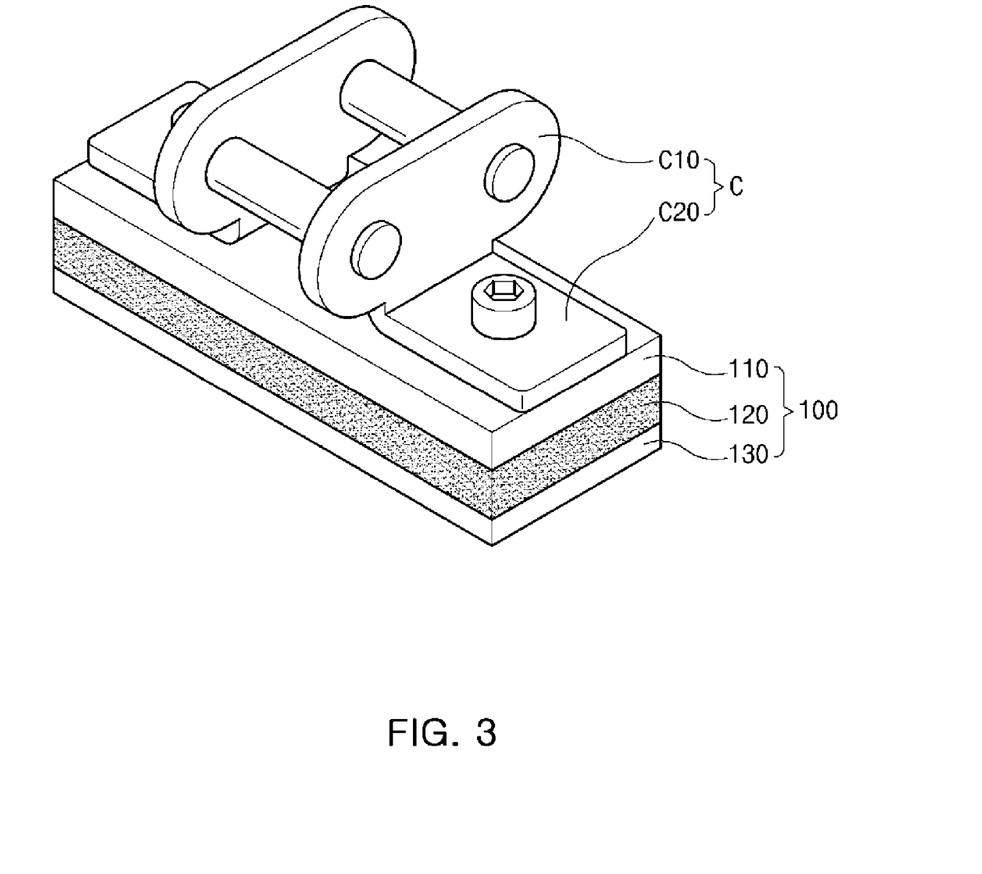
FIG. 3 is a perspective view showing a water film removing part and a power transmission member shown in FIG. 1.
Figure 4:
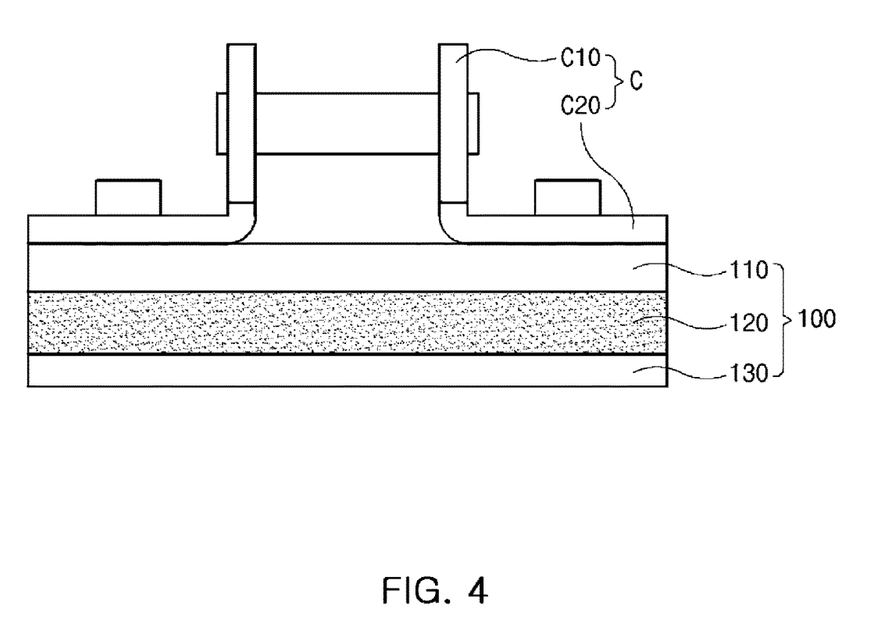
FIG. 4 is a front view of FIG. 3.
Figure 5:
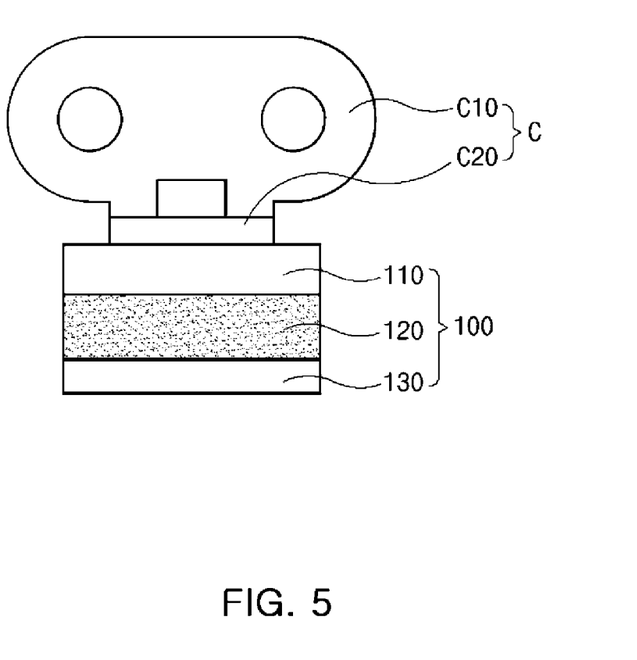
FIG. 5 is a side view of FIG. 3.
Figure 6:
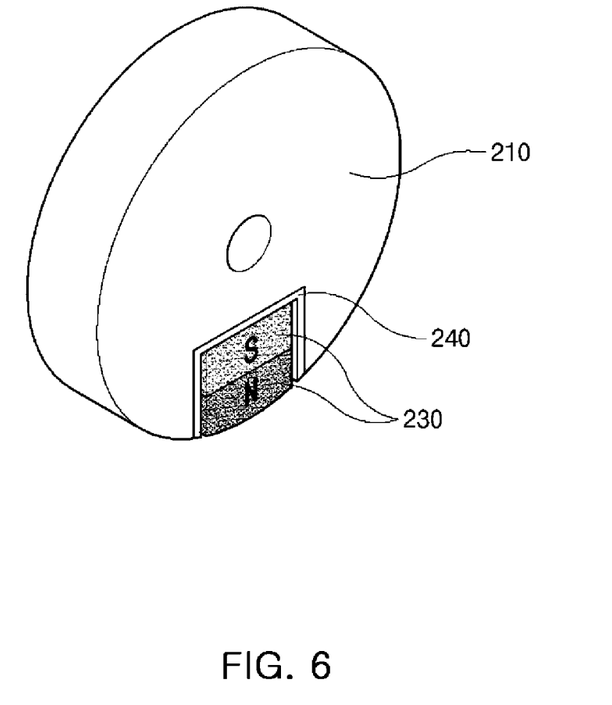
FIG. 6 is a side sectional view of a balance block shown in FIG. 1.
Figure 7:
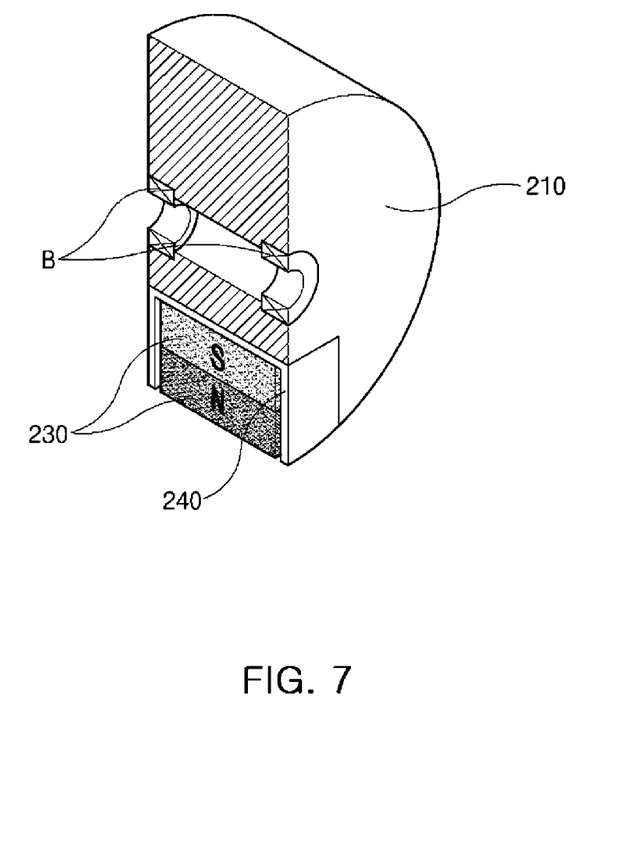
FIG. 7 is a front sectional view of the balance block shown in FIG. 1.

FIG. 1 is a perspective view showing a caterpillar device according to one embodiment of the present invention, FIG. 2 is a front view of FIG. 1. FIG. 3 is a perspective view showing a water film removing part and a power transmission member shown in FIG. 1. FIG. 4 is a front view of FIG. 3. FIG. 5 is a side view of FIG. 3. FIG. 6 is a side sectional view of a balance block shown in FIG. 1. FIG. 7 is a front sectional view of the balance block shown in FIG. 1.

As shown in these figures, a caterpillar device 1 according to this embodiment includes a water film removing part 100 which is provided in a power transmission member G including chains, presses and removes a water film between an attachment object 10 as a magnetic material and the power transmission member C with a magnetic force, and attaches the power transmission member C to the attachment object 10, an apparatus body magnet attachment part 200 which is connected to the power transmission member C and attaches an apparatus body to the attachment object 10, and a tension adjusting part 300 which supports the power transmission member C of the water film removing part 100 to adjust the tension of the power transmission member C.

The water film removing part 100 secures a frictional force by securing time for which a viscous hydroplaning effect is removed by consistently applying a pressure between the power transmission member C including the chains and the attachment object 10 (for example, the surface of the bottom of a ship) with a magnetic force.

In addition, the water film removing part 100 which is combined to the body of an apparatus such as a ship cleaning and inspecting apparatus and plays a role to provide a fractional force to the attachment object 10.

In this embodiment, as shown in FIG. 3, the water film removing part 100 includes a ferromagnetic body 110 removably coupled to an attachment member C20 of the power transmission member C including the chains, a water film removing magnet 120 coupled to the bottom of the ferromagnetic body 110, and a friction member 130 coupled to the bottom of the water film removing magnet 120.

The ferromagnetic body 110 of the water film removing part 100 serves to move a magnetic field of the water film removing magnet 120 toward the attachment object 10 and couple the water film removing magnet 120 to the attachment member C20 of the power transmission member C.

In this embodiment, since the ferromagnetic body 110 is provided on the top surface of the water film removing magnet 120, a magnetic force generated in the top surface of the water film removing magnet 120 is mostly blocked by the ferromagnetic body 110 and is concentrated toward the surface of the bottom of the ship, thereby strengthening a magnet adsorptive force.

In this embodiment, the ferromagnetic body 110 can be removably coupled to the attachment member C20 by bolts.

In addition, in this embodiment, the ferromagnetic body 110 can be treated with molding or coating for prevention of corrosion, like the water film removing part 100, as will be described later.

The water film removing magnet 120 of the water film removing part 100 serves to attach the ship cleaning and inspecting apparatus to the ship bottom as the attachment object 10.

In this embodiment, the water film removing magnet 120 includes a permanent magnet or an electromagnet.

In addition, in this embodiment, the water film removing magnet 120 may be divided into several, pieces to be coupled to the ferromagnetic body 110 and may be provided to have a different polarity. For example, an M pole or a S pole may be selectively directed to the attachment object 10 or may be arranged at both edges.

Further, the water film removing magnet 120 may be provided in such a manner that several poles are arranged in a single magnet.

The friction member 130 of the water film removing part 100 is provided to secure a fractional force between the water film removing magnet 120 and the attachment object 10. In this embodiment, the friction member 130 may be made of one selected from a group consisting of rubber, urethane and silicone, used to manufacture shoes and tires.

The apparatus body magnet attachment part 200 is provided in the power transmission member C between water film removing parts 100 arranged in two rows, as shown in FIG. 1. The apparatus body magnet attachment part 200 serves to attach the apparatus body connected to the apparatus body magnet attachment part 200 to the attachment object 10 by applying a magnetic force to the water film removing part 100 toward the attachment object 10.

In addition, in this embodiment, the apparatus body magnet attachment part 200 plays a role to add a pressure to remove a water film by applying a magnetic force to the water film removing part 100.

In this embodiment, as shown in FIG. 1, the apparatus body magnet attachment part 200 includes a balance block 210 which is made of polymer and is interposed between the water film removing parts 100 arranged in two rows, a block sprocket 220 which is coupled to both ends of a supporting shaft 211 provided in the balance block 210 and is in gear engagement with the unit chain C10 of the power transmission member C, a block magnet 230 provided inside the balance block 210, and a magnetic shielding block 240 which is provided inside the balance block 210, concentrates a magnetic field generated in the block magnet 230 toward the attachment object 10, and minimizes an effect of the magnetic field.

The balance block 210 of the apparatus body magnet attachment part 200 may have a circular shape to be easily rotated in accordance with weight balance between the block magnet 230 and the magnetic shielding block 240 and may be held in parallel to the bottom of the block magnet 230 in all directions of the attachment object 10.

In this embodiment, as shown in FIG. 7, the balance block 210a may be provided with a pair of bearings B by which the balance block 210 can be smoothly rotated.

The block magnet 230 of the apparatus body magnet attachment part 200 may include a permanent magnet or an electromagnet and may be selectively provided with a polarity, an N pole or an S pole. In the opposite direction to the attachment object 10.

The block magnet 230 of the apparatus body magnet attachment part 200 may include a permanent magnet or an electromagnet and may be selectively provided with a polarity, an N pole or an S pole, in the opposite direction to the attachment object 10.

As shown in FIGS. 6 and 7, the magnetic shielding block 240 of the apparatus body magnet attachment part 200 is provided in an edge of the balance block 21 and serves to concentrate a magnetic force generated in the block magnet 230 on the attachment object 10 and minimize an effect of the magnetic field on the vicinity of the balance block 210.

In this embodiment, the magnetic shielding block 240 may be formed of a ferromagnetic material and may be coupled to a groove formed in the balance block 210 by means of bolt/nut, fitting, welding or an adhesive.

Figure 8:
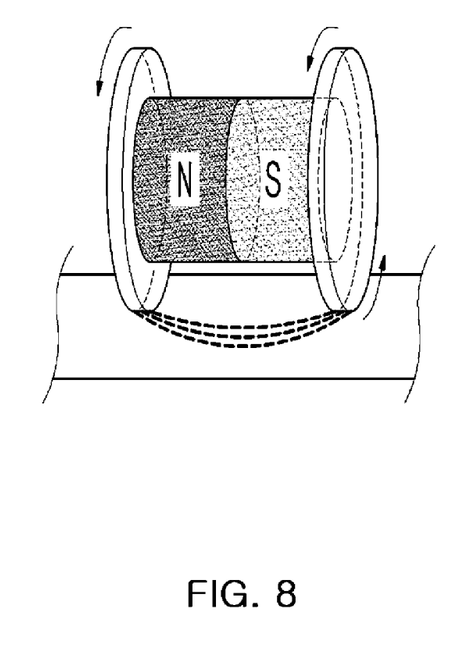
FIGS. 8 and 9 are views showing a magnetic wheel system used in an apparatus body magnet attachment part shown in FIG. 1 according to another embodiment.
Figure 9A:
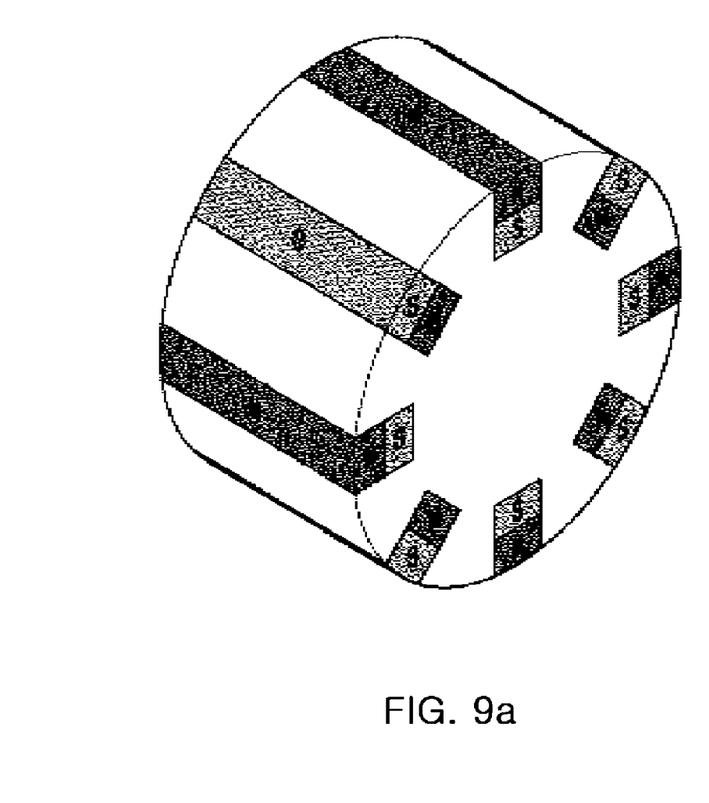
Figure 9B:
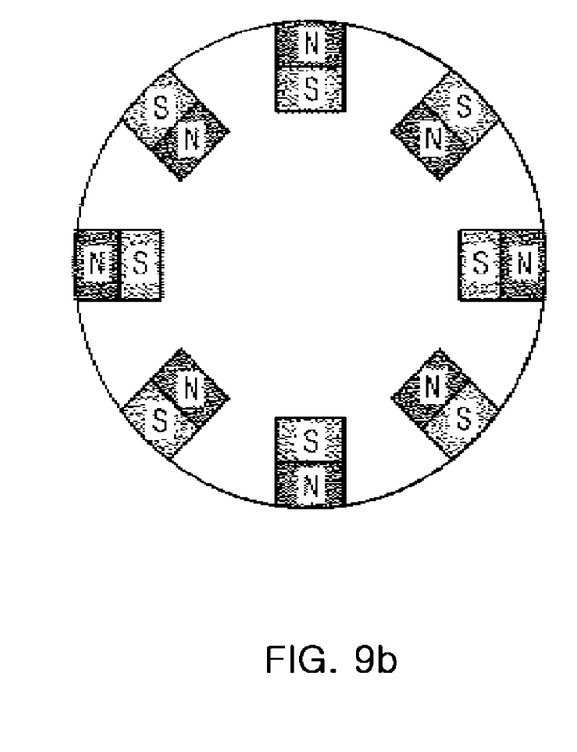

In this embodiment, as shown in FIGS. 8 and 9, the apparatus body magnet attachment part 200 may be modified in different forms.

As shown in FIGS. 1 and 2, the tension adjusting part 300 serves to support one side of the unit chain of the power transmission member C such that the power transmission member C has tension.

In this embodiment, as shown in FIG. 1, the tension adjusting part 300 includes a tension sprocket 310 which is connected to the unit chain C10 of the power transmission member C in gear engagement and supports the power transmission member C, and a tension support shaft 320 which is coupled to the tension sprocket 310 and supports the tension sprocket 310.

Figure 10:
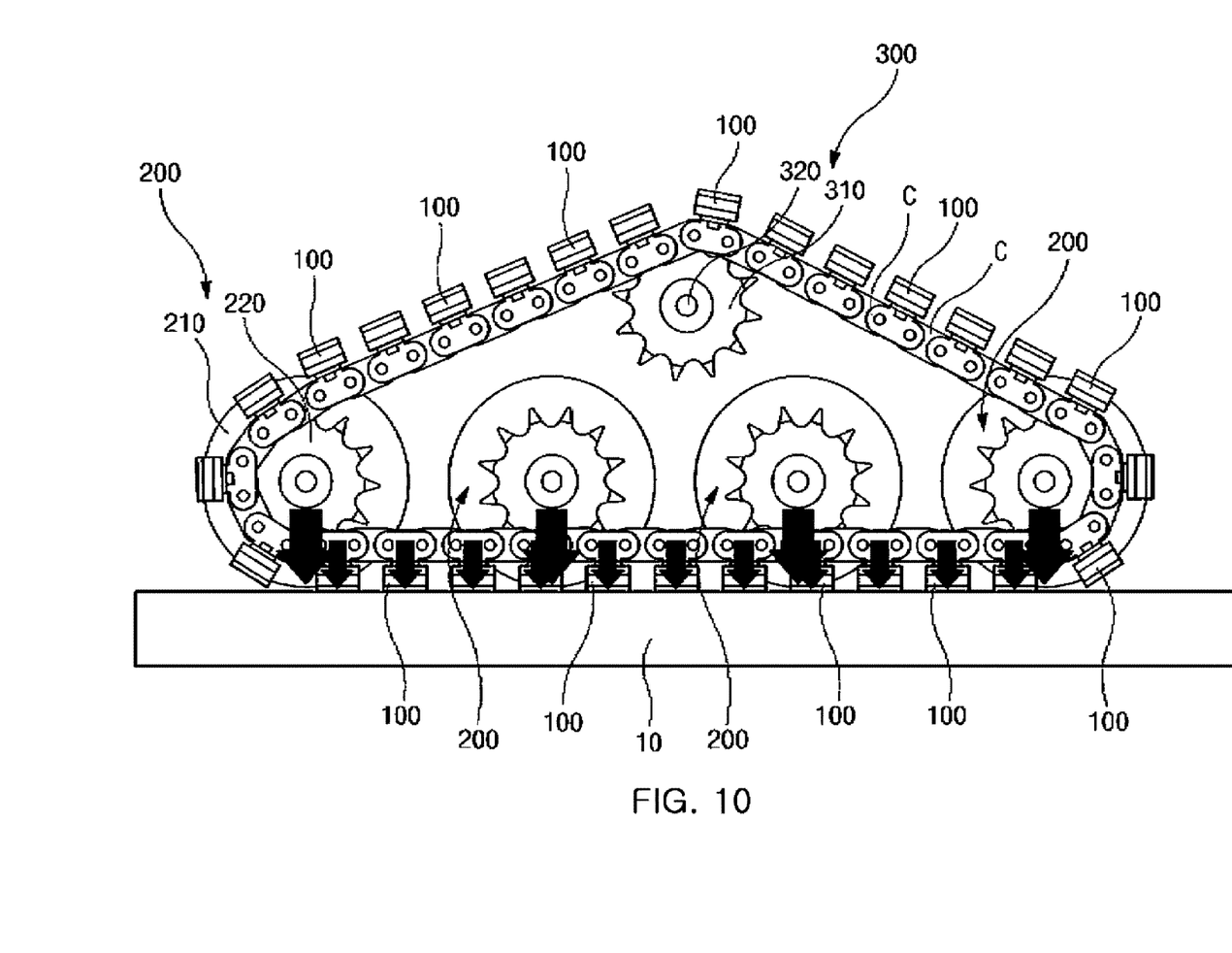
FIG. 10 is a view showing the force operation of attached magnets according to this embodiment.

FIG. 10 is a view showing the force operation of attached magnets according to this embodiment.

Hereinafter, a use state of the apparatus according to this embodiment will be described in brief with reference to FIG. 10.

In this embodiment, the viscous hydroplaning between the power transmission member C and the attachment object 10 is removed by the water film, removing part 100, thereby allowing an object apparatus such as the ship cleaning and inspecting apparatus to secure a frictional force for the attachment object 10.

In addition, since the water film removing part 100 can be adhered to the attachment object 10 by applying a magnetic force to the water film removing part 100 by means of the apparatus body magnet attachment part 200, a pressure to remove the water film can be added and a frictional force can be partially increased.

In this embodiment, the apparatus body magnet attachment part 200 just applies the magnetic force to the water film removing part 100 without being directly attached to the attachment object 10, thereby having little effect on the rotation of tracks.

As described above, according to this embodiment, since the water film removing part provided in the power transmission member consistently applies a pressure between the apparatus of this embodiment and the attachment object, thereby securing time for which the viscous hydroplaning effect is removed, a frictional force of the apparatus of this embodiment against the attachment object can be secured.

In addition, the apparatus body can be attached to the ferromagnetic attachment object by the apparatus body magnet attachment part which is connected to the water film removing part and presses the water film removing part toward the attachment object.

While the present invention has been particularly shown and described with reference to exemplary embodiments thereof, it will be understood by those skilled in the art that various changes in form and details may be made therein without departing from the spirit and scope of the present invention. The exemplary embodiments are provided for the purpose of illustrating the invention, not in a limitative sense. Thus, it is intended that the present invention covers the modifications and variations of this invention provided they come within the scope of the appended claims and their equivalents.

What is claimed is:

1. A caterpillar device comprising:
a water film removing part which is provided in a power transmission member including chains, presses and removes a water film between an attachment object as a magnetic material and the power transmission member with a magnetic force, and attaches the power transmission member to the attachment object to secure a frictional force; and
an apparatus body magnet attachment part which is connected to the power transmission member and attaches the body of the apparatus to the attachment object,
wherein the water film removing part includes:
a ferromagnetic body removably coupled to the power transmission member;
a water film removing magnet coupled to a bottom of the ferromagnetic body; and
a friction member coupled to a bottom of the water film removing magnet, and
wherein a water drainage groove is provided in the friction member.

2. The caterpillar device according to claim 1, wherein the chains are provided to interconnect a plurality of unit chains each having an attachment member, and
wherein the ferromagnetic body is removably coupled to the attachment member.

3. The caterpillar device according to claim 1, wherein the water film removing magnet includes one of a permanent magnet and an electromagnet.

4. The caterpillar device according to claim 1, wherein the friction member is made of one selected from a group consisting of silicone, rubber and urethane.

5. The caterpillar device according to claim 1, wherein at least one of the ferromagnetic body and the water film removing magnet is treated with molding or coating.

6. The caterpillar device according to claim 1, wherein the apparatus body magnet attachment part includes:
a plurality of balance blocks each having a supporting shaft; and
a block sprocket which is coupled to the supporting shaft and is connected to the power transmission member in a chain-driving manner.

7. The caterpillar device according to claim 6, wherein the apparatus body magnet attachment part further includes a block magnet provided in each of the plurality of balance blocks.

8. The caterpillar device according to claim 7, wherein the apparatus body magnet attachment part further includes a magnetic shielding block which is provided in each of the plurality of balance blocks and shields a magnetic field generated in the block magnet.

9. The caterpillar device according to claim 7, wherein the block magnet includes one of a permanent magnet and an electromagnet.

10. The caterpillar device according to claim 1, further comprising a tension adjusting part which supports the power transmission member of the water film removing part to adjust the tension of the power transmission member.

11. The caterpillar device according to claim 10, wherein the tension adjusting part includes:
a tension sprocket which is connected to the power transmission member in a chain-driving manner and supports the power transmission member; and
a tension support shaft which is coupled to the tension sprocket and supports the tension sprocket.

12. The caterpillar device according to claim 1, wherein the water film removing part is provided in two rows, and
wherein the apparatus body magnet attachment part is interposed between the water film removing parts arranged in two rows and has both ends connected to the power transmission member.

13. The caterpillar device according to claim 1, wherein the caterpillar device is used for at least one of cleaning and inspection of the bottom of a ship.

* * * * *